(12) United States Patent
Kaku et al.

(10) Patent No.: US 11,128,577 B2
(45) Date of Patent: Sep. 21, 2021

(54) RELAY APPARATUS

(71) Applicant: DENSO CORPORATION, Kariya (JP)

(72) Inventors: Yoshifumi Kaku, Kariya (JP); Taichi Itagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 156 days.

(21) Appl. No.: 16/674,102

(22) Filed: Nov. 5, 2019

(65) Prior Publication Data

US 2020/0162405 A1    May 21, 2020

(30) Foreign Application Priority Data

Nov. 21, 2018    (JP) .............................. JP2018-218214

(51) Int. Cl.

| | |
|---|---|
| *H04L 12/28* | (2006.01) |
| *H04L 12/947* | (2013.01) |
| *H04L 29/06* | (2006.01) |
| *H04L 29/12* | (2006.01) |
| *H04L 12/823* | (2013.01) |
| *G06F 16/28* | (2019.01) |
| *H04B 7/14* | (2006.01) |

(52) U.S. Cl.
CPC ............ *H04L 49/25* (2013.01); *G06F 16/285* (2019.01); *H04B 7/14* (2013.01); *H04L 47/32* (2013.01); *H04L 61/20* (2013.01); *H04L 69/16* (2013.01); *H04L 61/6022* (2013.01)

(58) Field of Classification Search
None
See application file for complete search history.

(56) References Cited

U.S. PATENT DOCUMENTS

| | | | | |
|---|---|---|---|---|
| 7,539,134 | B1* | 5/2009 | Bowes | H04L 1/0072 |
| | | | | 370/230 |
| 8,914,467 | B2* | 12/2014 | Onoue | G06F 21/554 |
| | | | | 709/217 |
| 9,531,566 | B2* | 12/2016 | Ishii | H04L 12/4641 |
| 10,484,280 | B2* | 11/2019 | Seo | H04L 45/66 |
| 2003/0037163 | A1* | 2/2003 | Kitada | H04L 61/6022 |
| | | | | 709/236 |
| 2006/0089757 | A1* | 4/2006 | Yoshimura | H04L 12/40 |
| | | | | 701/2 |
| 2007/0268823 | A1* | 11/2007 | Madison | H04L 47/10 |
| | | | | 370/229 |

(Continued)

FOREIGN PATENT DOCUMENTS

JP    2007-318582 A    12/2007

*Primary Examiner* — Phuongchau Ba Nguyen
(74) *Attorney, Agent, or Firm* — Posz Law Group, PLC

(57) ABSTRACT

A relay apparatus relays a frame between communication lines. The relay apparatus includes an item group record portion that records at least one item group that includes classification items for identifying a received frame; a condition record portion that records action conditions each of which includes a setting of whether each of the classification items is set to be valid, and a process content for the frame; a rule generation portion that generates a filtering rule for the received frame by extracting at least one of the classification items set to be valid for each of the action conditions and by associating the extracted classification item with the process content, when receiving the frame; and a process execution portion that executes a process on the received frame in accordance with the filtering rule.

11 Claims, 7 Drawing Sheets

(56) References Cited

U.S. PATENT DOCUMENTS

| | | | |
|---|---|---|---|
| 2008/0250496 A1* | 10/2008 | Namihira | H04L 45/742 |
| | | | 726/22 |
| 2009/0304008 A1* | 12/2009 | Kono | H04L 29/12839 |
| | | | 370/395.53 |
| 2010/0031106 A1* | 2/2010 | Isoyama | H04L 12/4625 |
| | | | 714/746 |
| 2012/0233431 A1 | 9/2012 | Izawa et al. | |
| 2015/0334016 A1 | 11/2015 | Izawa et al. | |
| 2016/0344601 A1* | 11/2016 | Kaku | H04L 12/46 |

* cited by examiner

FIG. 2

| RULE No. | APPLICATION PORT | DESTINATION ADDRESS | TRANSMISSION SOURCE MAC ADDRESS | TYPE | TRANSMISSION SOURCE IP ADDRESS | SUBNET MASK | CONDITION | ... |
|---|---|---|---|---|---|---|---|---|
| 1 | P1 | FIRST ECU | FIRST ECU | IPv4 | xxx.xxx.xx.xx | 255.255.x.x | xxx | |
| 2 | P4 | FOURTH ECU | FOURTH ECU | IPv4 | xxx.xxx.xx.xx | 255.255.x.x | xxx | |
| 3 | | | | | | | | |
| ... | | | | | | | | |

| RULE No. | ACTION No. | PROCESS CONTENT | TRANS-MISSION | RECEPTION | DESTINATION ADDRESS | TRANSMISSION SOURCE MAC ADDRESS | TYPE | TRANSMISSION SOURCE IP ADDRESS | SUBNET MASK | CONDITION... | ... |
|---|---|---|---|---|---|---|---|---|---|---|---|
| 1 | 1 | DISCARD | ON | ON | OFF | OFF | ON | OFF | OFF | OFF | |
| | 2 | TRANSFER | OFF | ON | OFF | ON | ON | OFF | OFF | OFF | |
| | 3 | TRANSFER | ON | OFF | ON | OFF | ON | OFF | OFF | OFF | |
| 2 | 1 | DISCARD | ON | ON | OFF | ON | ON | OFF | OFF | OFF | |
| | 2 | TRANSFER | OFF | ON | OFF | ON | ON | OFF | OFF | OFF | |
| | 3 | TRANSFER | ON | OFF | ON | OFF | ON | OFF | OFF | OFF | |

| RULE No. | APPLICATION PORT | ~ | VLAN ADDRESS | TCP PORT | UDP PORT |
|---|---|---|---|---|---|
| 1 | P1 | | xxx.xxx.xx.xx | xxxxx | xxx |
| 2 | P4 | | xxx.xxx.xx.xx | xxxxx | xxx |
| 3 | | | | | |
| ... | | | | | |

26

RELAY APPARATUS

CROSS REFERENCE TO RELATED APPLICATION

The present application claims the benefit of priority from Japanese Patent Application No. 2018-218214 filed on Nov. 21, 2018. The entire disclosure of the above application is incorporated herein by reference.

TECHNICAL FIELD

The present disclosure relates to a relay apparatus that relays a frame between multiple communication lines.

BACKGROUND

The relay apparatus described above may have a function of filtering a relayed frame. The frame corresponds to general data including actual data and a header in accordance with a predetermined protocol. For example, as a comparative example, a technique in which many filtering rules are prepared and it is set whether the frame is relayed or discarded in accordance with the many filtering rules or the like has been proposed.

SUMMARY

According to one example embodiment of the present disclosure, a relay apparatus may relay a frame between multiple communication lines. The relay apparatus may include an item group record portion, a condition record portion, a rule generation portion, and a process execution portion.

The item group record portion may record at least one item group that includes multiple classification items for identifying a received frame. The condition record portion may record multiple action conditions, and a process content for the frame.

The rule generation portion may generate a filtering rule. The process execution portion may execute the process on the received frame in accordance with the filtering rule.

BRIEF DESCRIPTION OF DRAWINGS

The above and other objects, features and advantages of the present disclosure will become more apparent from the following detailed description made with reference to the accompanying drawings. In the drawings:

FIG. 2 is an explanatory diagram showing an example of an item group table;

FIG. 3 is an explanatory diagram showing an example of an action table;

FIG. 7 is an explanatory diagram showing an example of the item group table according to the other embodiments.

DETAILED DESCRIPTION

Figure 1:
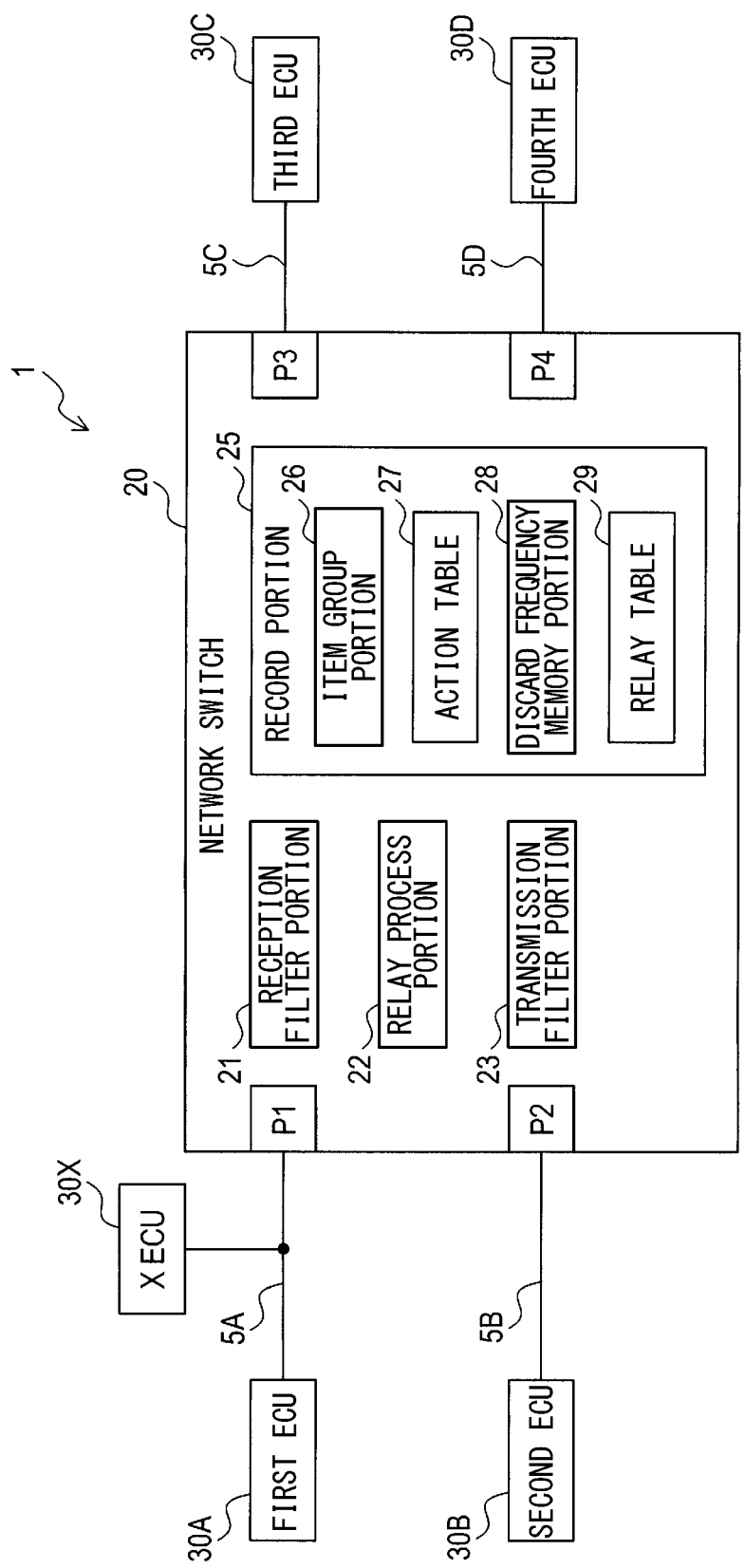
FIG. 1 is a block diagram showing a configuration of a communication system.

A result of detailed studies of the inventors has found that the relay apparatus described above has a difficulty of requiring a record area having a large capacity for recording the filtering rules since it is necessary to prepare the many filtering rules.

One example embodiment of the present disclosure to reduce a record area of data prepared in advance for filtering in a relay apparatus that relays a frame between multiple communication lines.

According to one example embodiment, a relay apparatus relays a frame between multiple communication lines. The relay apparatus includes an item group record portion, a condition record portion, a rule generation portion, and a process execution portion.

The item group record portion records at least one item group that includes multiple classification items for identifying a received frame. The condition record portion records multiple action conditions each of which includes a setting of whether each of the multiple classification items in the item group is set to be valid for each of the classification items, and a process content for the frame.

The rule generation portion generates a filtering rule for the received frame by extracting at least one of the classification items set to be valid from the item group for each of the multiple action conditions and by associating the extracted classification item with the process content, when receiving the frame from any of the communication lines. The process execution portion executes the process on the received frame in accordance with the filtering rule.

According to the configuration, the filtering rule is generated based on the item group including the multiple classification items and the multiple action conditions. Therefore, it may be only necessary to prepare the item group and the action conditions in advance in the record portion including the item group record portion and the condition record portion. It may be unnecessary to prepare the filtering rule.

In the configuration, it may be possible to generate the filtering rule as many as the number of combinations of the item group and the action condition. That is, as the number of item groups and the number of action conditions increase, the number of generatable filtering rules increases. Accordingly, it may be possible to reduce the capacity of the record capacity for recording the data prepared in advance for the filtering, as compared with a configuration in which the filtering rules are individually prepared.

1. Overview

As a network switch relaying a frame between multiple communication devices, Ethernet (registered trademark) Switch has been known. The Ethernet Switch has a function of filtering the frame. However, it may be difficult to prepare a filtering rule for each of transmission and reception, and provide an appropriate action. Particularly, in a use case where only a specific address is allowed to pass for each of the transmission and the reception, it is necessary to prepare many filtering rules, which causes a resource to be pressed. That is, a record area having a large capacity for recording the filtering rule is necessary. The filtering rule corresponds to a rule for determining a process such as whether to relay or discard the frame in accordance with an address in the received frame, a characteristic of the frame, or the like.

In the present embodiment, the network switch includes a reception filter portion that filters a reception frame, and a transmission filter portion that filters a transmission frame. The network switch is able to perform the filtering on each of the transmission and the reception. The network switch includes an item group table and an action table as a table for the filtering rule. In the item group table, a condition for the filtering such as an applicable port, each condition (MAC address, Ether Type, or the like) is set.

In the action table, an actually executed process content such as discard and transfer, ON and OFF states of conditions, selection of transmission and reception filters may be set. In the following embodiment, it is set that each of the rules is able to have three actions. Thereby, it may be possible to provide an filter operation such as discarding the frame transmitted to or received from an address other than a specific address, the filter operation in association with one rule.

Details of the configuration will be described below.

2. Embodiment

Hereinafter, an embodiment of the present disclosure will be described with reference to the drawings.

[2-1. Configuration]

A communication system 1 is, for example, a system that is mounted on a vehicle such as a passenger car and relays the frame between each of the communication devices in the vehicle.

The communication system 1 shown in FIG. 1 includes a network switch 20 corresponding to a relay apparatus. The communication system 1 may include a first ECU 30A, a second ECU 30B, a third ECU 30C, a fourth ECU 30D, and ports P1, P2, P3, and P4.

The first ECU 30A is connected to a communication line 5A. The second ECU 30B is connected to a communication line 5B. The third ECU 30C is connected to a communication line 5C. The fourth ECU 30D is connected to a communication line 5D. The first ECU 30A, the second ECU 30B, the third ECU 30C, and the fourth ECU 30D configure a communication device performing mutual communication via the communication lines 5A, 5B, 5C, and 5D and the network switch 20. The four communication lines 5A, 5B, 5C, and 5D are sequentially connected to the ports P1, P2, P3, and P4. The ports P1, P2, P3, and P4 function as a transceiver transmitting/receiving the frame.

The network switch 20 is configured as a layer 2 switching that performs communication by utilizing a protocol such as, for example, Ethernet (registered trademark) and Internet Protocol.

The network switch 20 relays the frame while filtering the frame among the multiple communication lines 5A, 5B, 5C, and 5D.

The network switch 20 is configured as, for example, as a hardware including a circuit such a semiconductor device or the like. The network switch 20 includes a reception filter portion 21, a relay process portion 22, a transmission filter portion 23, and a record portion 25.

The reception filter portion 21 generates the filtering rule applied at the frame reception by executing the filter process described later when the frame is received. The relay process portion 22 manages the overall relay of the frame by executing the relay process described later. For example, the relay process portion 22 executes a process to the frame in accordance with the generated filtering rule. The transmission filter portion 23 generates the filtering rule applied at the transmission of the frame by executing the filter process similar to that at the reception of the frame when the frame is transmitted.

The record portion 25 records an item group table 26, an action table 27, a discard frequency memory portion 28, and a relay table 29.

In the item group table 26, at least one item group having multiple classification items for classifying the received frame is described. In the item group table 26, as shown in FIG. 2, the multiple item groups are described. The item group corresponds to description items for one line. That is, the item groups for the multiple lines are described.

Each of the item groups includes, as the multiple classification items, a rule number (No.), an application port, a destination address, a transmission source MAC address, a type, a transmission source IP address, a subnet mask, other conditions.

The rule number corresponds to a number for identifying the item group. A unique number is assigned to the rule number for each item group. The application port indicates a port to which the setting is applied in the item group among the ports P1, P2, P3, and P4. In the destination address, the address of the ECU corresponding to the transmission source of the frame, for example, the MAC address is described.

However, the destination address may correspond to an address other than the MAC address such as the IP address. The type indicates a version of the internet protocol such as IPv4 or IPv6. The subnet mask indicates a valid range of the IP address.

In an example shown in FIG. 2, it is described that, in the item group of a rule number 1, only a frame in which the transmission source address corresponds to the first ECU 30A in the IPv4 first received at the port P1 is transferred. Further, it is described that only a frame in which the destination address corresponds to the first ECU 30A in the IPv4 frame transmitted from the port P1 is transferred. In the item group of a rule number 2, it is described that only a frame in which the transmission source address corresponds to the fourth ECU 30D in the IPv4 first received at the port P4 is transferred. Further, it is described that only a frame in which the destination address corresponds to the fourth ECU 30D in the IPv4 frame transmitted from the port P4 is transferred.

The item group described in the item group table 26 corresponds to an element of the filtering rule and does not indicate rule itself since each of the classification items is set as valid or invalid in the action table 27. The item group table 26 is utilized in combination with the action table 27 when the filtering rule is generated.

In the action table 27, as shown in FIG. 3, the multiple action conditions are described. The description item for one line corresponds to the action condition. Each of the action conditions includes a setting of whether to set each of the classification items in the multiple item groups to be valid for each classification item, and a process content for the frame. Hereinafter, the setting may be also referred to as each setting.

In an example shown in FIG. 3, each setting is described as ON or OFF. When the setting is described as ON, it is recognized that the setting is valid. When the setting is described as OFF, it is recognized that the setting is invalid.

Each action condition includes the rule number, the action number, the process content, and each setting. The rule number corresponds to a number set in association with the rule number in the item group table 26. The action numbers correspond to multiple numbers prepared for the rule numbers. Each of the action numbers corresponds to a number for identifying the action condition.

The process content indicates what kind of process is performed on the received frame or the frame to be transmitted. As the process content, any one of transfer, discard, priority overwrite, and overwrite of a transfer destination port is settable.

The transfer indicates allowance of the process of transmitting the frame to the designated destination. However, when the process such as the discard is determined before the frame is actually transmitted, the process of the transfer is invalidated.

The discard indicates deleting without transmitting the frame from any port.

The priority overwrite indicates that the setting in an input port or a discard priority determined based on a priority field in the frame is ignored and the priority is changed to a discard priority designated by the filtering rule.

The overwrite of the transfer destination port indicates that the original relay destination determined based on the destination address or the like is ignored and the frame is transmitted from the destination port designated by the filtering rule. Then, the frame is transmitted from the destination port designated by the filtering rule without being discarded also when there is not the original relay destination.

Each setting is prepared for each classification item of the item group table 26. The multiple action conditions are set so that the priority order of the action conditions increases as the rule number increases or the action number increases. The discard frequency memory portion 28 corresponds to a record area for recording the number of times when the frame is discarded for each filtering rule.

The relay table 29 corresponds to a table for recording the destination address of the ECU connected to each port. The relay table 29 is referred by the relay process portion 22 when the relay process portion 22 identifies the port of the transmission destination for the frame.

The present embodiment exemplifies a case where the number of communication lines connected to the network switch 20 is four. However, the number of communication lines may be two or more.

[2-2. Process]

[2-2-1. Relay Process]

Figure 4:
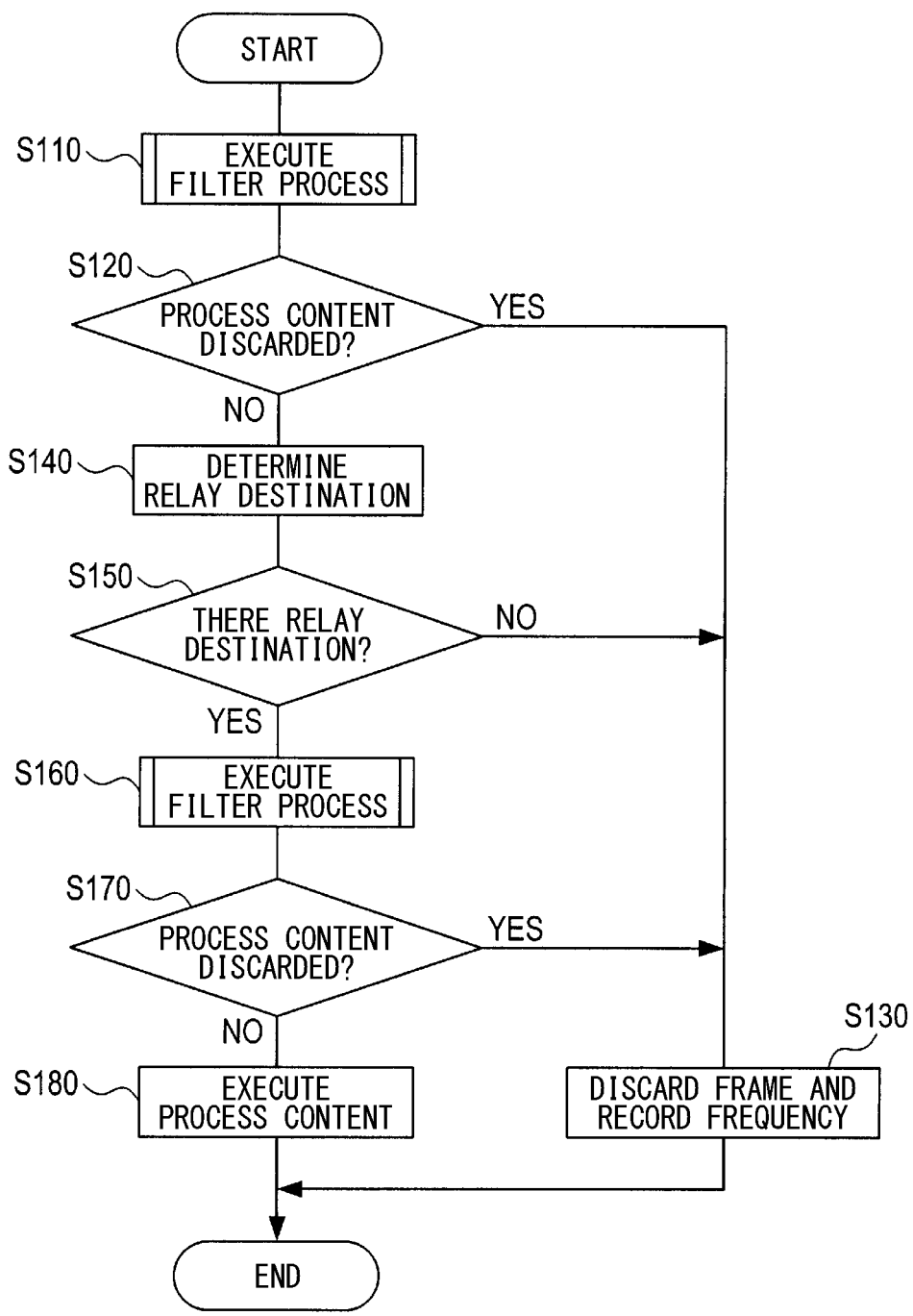
FIG. 4 is a flowchart showing a relay process.

The relay process executed by the relay process portion 22 will be described with reference to a following of FIG. 4. The relay process corresponds to a process executed every time when the frame is received from any port.

In the relay process, first, in S110, the relay process portion 22 executes a filter process. The filter process is executed as an independent process at each of the time when the frame is received and the time when the frame is transmitted. Details of the filter process will be described later.

In S120, the relay process portion 22 executes the filtering rule by utilizing the filtering rule generated in S110, and determines whether the process content for the received frame is discarded. When the relay process portion 22 determines that the process content for the received frame is discarded in S120, the process shifts to S130. The relay process portion 22 discards the frame, and records the number of discard times in the discard frequency memory portion 28. Then, the relay process portion 22 associates with the number of times when the frame is discarded, the rule number and the action number for identifying the filtering rule determining the discard of the frame. The relay process portion 22 records in the discard frequency memory portion 28, the associated number of times when the frame is discarded.

By contrast, when the relay process portion 22 determines that the process content for the received frame is not discarded in S120, the process shifts to S140. The relay process portion 22 confirms whether the relay destination exists. That is, the relay process portion 22 confirms whether the communication device such as the ECU designated as the destination address exists in the relay table 29.

In S150, the relay process portion 22 determines whether the relay destination exists. When the relay process portion 22 determines that the relay destination does not exist in S150, the process shifts to S130 described above. By contrast, when the relay process portion 22 determines that the relay destination exists in S150, the process shifts to S160. The relay process portion 22 executes the filter process. The details of the filter process will be described later.

In S170, the relay process portion 22 executes the filtering rule by utilizing the filtering rule generated in S160, and determines whether the process content for the received frame is discarded. When the relay process portion 22 determines that the process content for the received frame is discarded in S170, the process shifts to S130 described above.

By contrast, when the relay process portion 22 determines that the process content for the received frame is not discarded in S170, the process shifts to S180. The relay process portion 22 executes the set process content. For example, after executing the process such as the transfer of the frame to the designated port, the relay process portion 22 ends the relay process of FIG. 4.

[2-2-2. Filter Process]

The filter process executed by the reception filter portion 21 or the transmission filter portion 23 will be described with reference to a flowchart of FIG. 5. The filter process at the frame reception and the filter process at the frame transmission are similar to each other. Therefore, the filter processes are collectively described as the filter process. The filter process corresponds to a process in which the reception filter portion 21 and the transmission filter portion 23 generate the filtering rule.

In the filter process, in S210, the reception filter portion 21 or the transmission filter portion 23 selects the rule number 1 and the action number 1 in the action table 27.

In S220, the reception filter portion 21 or the transmission filter portion 23 searches the action condition in accordance with the selected rule and the action from the action table 27.

In S230, the reception filter portion 21 or the transmission filter portion 23 compares the valid item with the reception frame, and determines whether there is a match item. That is, the reception filter portion 21 or the transmission filter portion 23 determines whether there is at least one item in which the characteristic such as the type of the reception frame, the address of the reception frame, or the like matches the condition such as the characteristic or the address set as the valid item. For example, when the type of the reception frame corresponds to IPv4 and the type in accordance with IPv4 corresponds to the valid item, the types are matched. Therefore, in the process, the reception filter portion 21 or the transmission filter portion 23 determines as affirmative. It is assumed that, when each setting of the action condition is in the ON state, the item is valid. Further, it is assumed that, when the state each setting of the action condition is in the OFF state, the item is invalid.

When the reception filter portion 21 or the transmission filter portion 23 determines that there is the item for which the valid item and the reception frame match each other in S230, the process shifts to S240. The reception filter portion 21 or the transmission filter portion 23 overwrites the process content for the matched item, and generates the filtering rule. Details of S240 will be described later.

By contrast, when the reception filter portion 21 or the transmission filter portion 23 determines that there is not the item for which the valid item and the reception frame match each other in S230, the process shifts to S250. The reception filter portion 21 or the transmission filter portion 23 determines whether to select a final action number. The final action number indicates the highest number in accordance with the selected rule number. In the present embodiment, the final action number is 3.

When the reception filter portion 21 or the transmission filter portion 23 determines that the final action number is not selected in S250, the process shifts to S260. After the reception filter portion 21 or the transmission filter portion 23 selects the next action number, the process returns to S220.

By contrast, when the reception filter portion 21 or the transmission filter portion 23 determines that the final action number is selected in S250, the process shifts to S270. The reception filter portion 21 or the transmission filter portion 23 determines whether to select the final rule number. In the example shown in FIG. 2 and FIG. 3, the items of the rule number 3 and the following numbers are blank. Therefore, the final rule number is 2.

When the reception filter portion 21 or the transmission filter portion 23 determines that the final rule number is not selected in S270, the process shifts to S280. After the reception filter portion 21 or the transmission filter portion 23 selects the next rule number and also the action number No. 1, the process returns to S220.

Figure 5:
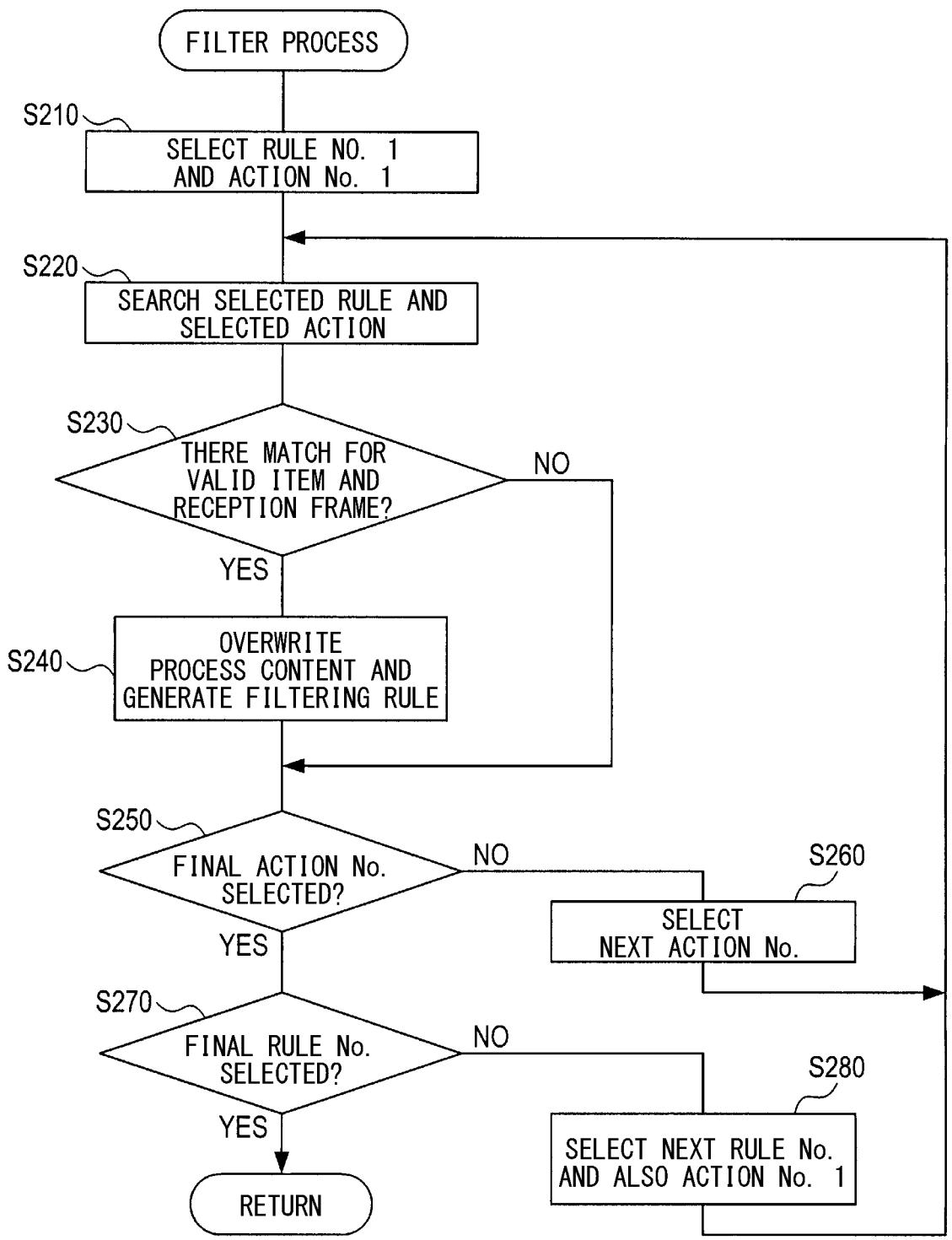
FIG. 5 is a flowchart showing a filter process.

By contrast, when the reception filter portion 21 or the transmission filter portion 23 determines that the final rule number is selected in S270, the reception filter portion 21 or the transmission filter portion 23 ends the filter process of FIG. 5.

[2-3. Example of Generating the Filtering Rule]

In the filter process, the reception filter portion 21 or the transmission filter portion 23 repeatedly executes the process in S240 while increasing the rule number and the action number. Thereby, the reception filter portion 21 or the transmission filter portion 23 sequentially overwrites the filtering rule with the action condition having the high priority order.

Figure 6:
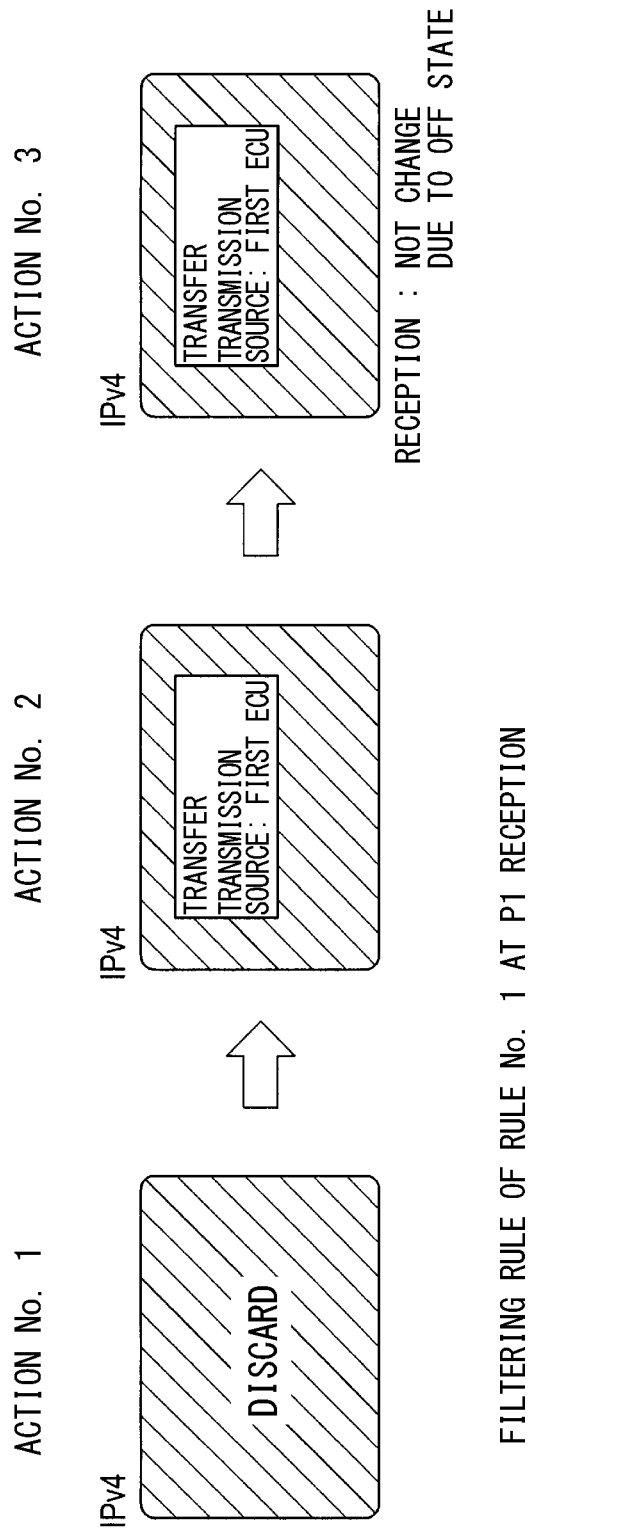
FIG. 6 is an explanatory diagram showing a generation example of a filtering rule.

For example, a filtering rule generation example based on the rule number 1 at the frame reception of the port P1 will be described with reference to FIG. 6. The reception filter portion 21 or the transmission filter portion 23 refers to the rule number 1 in the action table 27 and the action condition in the action number 1, and extracts the items of the transmission, the reception, and the type corresponding to the process contents and the valid items.

When the frame is received, it is necessary that the "reception" of the classification item corresponds to the valid item. When the "reception" of the classification item does not correspond to the valid item, the generation of the filtering rule is omitted. Similarly, when the frame is transmitted, it is necessary that the "transmission" of the classification item corresponds to the valid item. When the "transmission" of the classification item does not correspond to the valid item, the generation of the filtering rule is omitted.

The "reception" corresponds to the valid item in the action condition in accordance with the rule number 1 and the action number 1. Therefore, for the other items, the reception filter portion 21 or the transmission filter portion 23 refers to the item group table 26, and thereby generates, for the frame received at the port P1, the filtering rule of discarding all of the IPv4 frame as the process content.

When the process in S240 is executed again, the reception filter portion 21 or the transmission filter portion 23 refers to the action condition in accordance with the rule number 1 and the action number 2 in the action table 27, and generates the filtering rule of transferring the frame in which transmission source MAC address corresponds to the first ECU 30A. Then, the reception filter portion 21 or the transmission filter portion 23 overwrites a part in which the previously generated filtering rule conflicts with the newly generated filtering rule.

That is, although the IPv4 frame is discarded in principle, the filtering rule reflecting an exception of transferring the frame in which the transmission source MAC address corresponds to the first ECU 30A is generated. For example, as shown in FIG. 1, there is an xECU 30X that is not recognized by the network switch 20. When the xECU 30X is connected to the communication line 5A and the network switch 20 receives the frame from this xECU 30X, it is determined that the transmission source MAC address does not correspond to the first ECU 30A by utilizing the filtering rule described above. Therefore, the frame from the xECU 30X is discarded.

Further, when the process in S240 is executed again, the reception filter portion 21 or the transmission filter portion 23 refers to the rule number 1 in the action table 27 and the action condition of the action number 3. However, since the "reception" does not corresponds to the valid item in this action condition, the generation of the filtering rule is omitted.

In such a manner, the filtering rule is generated by the combination of the item group table 26 and the action table 27.

[2-3. Effects]

According to the embodiment detailed above, the following effects may be provided.

(2a) The communication system 1 in the described above embodiment includes the network switch 20 relaying the frame between the multiple communication lines. The network switch 20 includes the record portion 25, the reception filter portion 21, the relay process portion 22, and the transmission filter portion 23.

The record portion 25 records the item group table 26. In the item group table 26, at least one item group having the multiple classification items for classifying the received frame is described.

The record portion 25 records the action table 27. In the action table 27, the multiple action conditions including each of the settings of whether to set each of the classification items in the multiple item groups to be valid for each classification item, and each of the process contents for the frame are described.

When receiving the frame from any of the communication lines, the reception filter portion 21 and the transmission filter portion 23 extracts the classification item set to be valid from the item group, associates the extracted classification item with the process content, and thereby generates the filtering rule for the received frame, in the processes from in S210 to S280. In S130 and S180, the relay process portion 22 executes the process on the received frame in accordance with the filtering rule.

According to the configuration, the filtering rule is generated based on the item group including the multiple classification items and the multiple action conditions. Therefore, it may be only necessary to prepare the item group table 26 and the action table 27 in advance in the record portion 25. It may be unnecessary to prepare the filtering rule. In the configuration, it may be possible to generate the filtering rule as many as the number of multiplications (combinations) of the item group and the action condition.

That is, as the number of item groups and the number of action conditions increase, the number of generatable filtering rules increases. Accordingly, it may be possible to reduce the frame prepared in advance for the filtering, as compared with a configuration in which the filtering rules are individually prepared.

(2b) The priority order is assigned to each of the multiple action conditions described in the action table 27. In the processes in S210 to S280, the reception filter portion 21 and the transmission filter portion 23 generates the filtering rule for each of the action conditions. For the part in which the confliction of the process contents occurs in the filtering rule, the reception filter portion 21 and the transmission filter portion 23 generate the filtering rule by preferentially employing the filtering rule generated by utilizing the action condition having the high priority order.

According to the configuration, it may be possible to satisfactorily generate the filtering rule by utilizing the action condition having the high priority order for the part in which the confliction of the process contents occurs.

(2c) In the processes in S210 to S280, the reception filter portion 21 and the transmission filter portion 23 generate the filtering rule in ascending order of the priority order of the action condition. Then, for the part in which a second process content as the process content of the filtering rule generated later conflicts with a first process content as the process content of the filtering rule generated earlier, the first process content as the filtering rule generated earlier is overwritten with the second process content as the filtering rule generated later, and thereby the final filtering rule is generated.

According to the configuration, it may be possible to satisfactorily generate the filtering rule since the filtering rule is overwritten by utilizing the action condition having the high priority order for the part in the confliction of the process contents occurs.

(2d) In the record portion 25, the multiple classification items in the item group table 26 includes at least one of designation of the reception port or designation of the transmission port. The network switch 20 executes the process for the frame while generating the filtering rule at each of the time of receiving the frame and the time of transmitting the frame.

According to the configuration, it may be possible to perform the filtering on the frame at each of the time of receiving the frame and the time of transmitting the frame. Therefore, it may be possible to set the process content for the frame in more details.

(2e) The record portion 25 records, as the process content, any one of the transfer, the discard, the priority overwrite, and the overwrite of the transfer destination port.

According to the configuration, it may be possible to set, as the process content, any one of the transfer, the discard, the priority overwrite, and the overwrite of the transfer destination port.

(2f) In the record portion 25, the multiple classification items include the transmission MAC address and the reception MAC address or the transmission IP address and the reception IP address.

According to the configuration, it may be possible to designate the combination of the transmission MAC address and the reception MAC address or the combination of the transmission IP address and the reception IP address, and perform the filtering.

(2g) In the record portion 25, the multiple classification items include the IP address and the valid range for the IP address.

According to the configuration, it may be possible to designate the IP address and the valid range for the IP address, and perform the filtering.

(2h) The relay process portion 22 records the number of discard times for each filtering rule when the received frame is discarded in S130. In other words, the relay process portion 22 records a numeral number of a time when the received frame is discarded for each filtering rule when the received frame is discarded in S130.

According to the configuration, it may be possible to record the number of times when the frame is discarded for each filtering rule.

3. Other Embodiments

While the embodiment of the present disclosure has been described, the present disclosure is not limited to the embodiment described above and can be modified in various manners.

(3a) The described above embodiment describes the configuration in which the functions as the reception filter portion 21, the relay process portion 22, and the transmission filter portion 23 are implemented by the hardware. However, it is not limited to this. For example, these functions may be implemented by a process of software. In this case, the network switch 20 or the external device connected to the network switch 20 includes a CPU and a memory. The functions as the reception filter portion 21, the relay process portion 22, and the transmission filter portion 23 may be implemented by the CPU executing a program in the memory.

(3b) In the described above embodiment, in the record portion 25, the multiple classification items include the MAC address and the IP address.

However, as shown in FIG. 7, the multiple classification items may additionally include any of a VLANID, a TCP port, and an UDP port. The multiple classification items include any of range designation of the TCP port and range designation of the UDP port.

According to the configuration, it may be possible to designate the range for any of the TCP port and the UDP port in accordance with the MAC address, the IP address, the VLANID, the TCP port, and the UDP port, and perform the filtering.

(3b) Multiple functions of one element in the described above embodiment may be implemented by multiple elements, or one function of one element may be implemented by multiple elements. Further, multiple functions of multiple elements may be implemented by one element, or one function implemented by multiple elements may be implemented by one element. In addition, a part of the configuration of the described above embodiment may be omitted. At least a part of the configuration of the described above embodiment may be added to or replaced with another configuration of the described above embodiment.

(3c) In addition to the communication system 1 described above, various embodiments such as the devices such as the network switch 20 or the like configuring the communication system 1, a program for making the computer function as the network switch 20, the non-transitory tangible storage medium such as the semiconductor memory in which the program is stored, or a filtering rule generation method may implement the present disclosure.

4. Correspondence Relation Between the Configuration of the Embodiment and the Configuration of the Present Disclosure The network switch 20 in the described above embodiment corresponds to the relay apparatus in the present disclosure. The record portion 25 in the described above embodiment corresponds to an item group record portion and a condition record portion in the present disclosure. The processes in S210 to S280 among the processes executed by the reception filter portion 21 and the transmission filter portion 23 in the described above embodiment correspond to a rule generation portion in the present disclosure. The processes in S130 to S180 among the processes executed by the relay process portion 22 in the described above embodiment correspond to a process execution portion in the present disclosure. The process in S130 in the described above embodiment corresponds to a discard record portion in the present disclosure.

It is noted that a flowchart or the process of the flowchart in the present disclosure includes multiple steps (also referred to as sections), each of which is represented, for instance, as S110. Further, each step can be divided into several sub-steps while several steps can be combined into a single step.

The invention claimed is:

1. A relay apparatus configured to relay a frame between a plurality of communication lines, the relay apparatus comprising:
   an item group record portion configured to record at least one item group that includes a plurality of classification items for identifying a received frame;
   a condition record portion configured to record a plurality of action conditions each of which includes
      a setting of whether each of the plurality of classification items in the item group is set to be valid for each of the classification items, and
      a process content for the frame;
   a rule generation portion configured to generate a filtering rule for the received frame by extracting at least one of the classification items set to be valid from the item group for each of the plurality of action conditions and by associating extracted at least one of the classification items with the process content, when receiving the frame from any of the communication lines; and
   a process execution portion configured to execute a process on the received frame in accordance with the filtering rule.

2. The relay apparatus according to claim 1, wherein:
   each of the plurality of action conditions has a priority;
   the rule generation portion generates the filtering rule for each of the plurality of action conditions; and
   for a part in which a confliction of the process contents occurs in the filtering rule, the rule generation portion generates the filtering rule utilized by the process execution portion, by preferentially employing the filtering rule generated by utilizing the action condition having the priority that is high.

3. The relay apparatus according to claim 2, wherein:
   the rule generation portion generates the filtering rule in ascending order of the priority of the action condition; and
   for the part in which a second process content as the process content of the filtering rule generated later conflicts with a first process content as the process content of the filtering rule generated earlier, the rule generation portion generates the filtering rule by overwriting the filtering rule generated earlier with the filtering rule generated later.

4. The relay apparatus according to claim 1, wherein:
   in the item group record portion, the plurality of classification items include at least one of designation of a reception port or designation of a transmission port; and
   for each of a time when the frame is received and a time when the frame is transmitted, the relay apparatus executes generation of the filtering rule by the rule generation portion and the process which the process execution portion executes on the frame.

5. The relay apparatus according to claim 1, wherein:
   the condition record portion records, as the process content, at least one of transfer, discard, priority overwrite, and overwrite of a transfer destination port.

6. The relay apparatus according to claim 1, wherein:
   in the item group record portion, the plurality of classification items include at least one of a MAC address, an IP address, a VLANID, a TCP port, and an UDP port.

7. The relay apparatus according to claim 1, wherein:
   in the item group record portion, the plurality of classification items include at least one of range designation of the TCP port and range designation of the UDP port.

8. The relay apparatus according to claim 1, wherein:
   in the item group record portion, the plurality of classification items include a transmission MAC address and a reception MAC address or a transmission IP address and a reception IP address.

9. The relay apparatus according to claim 1, wherein:
   in the item group record portion, the plurality of classification items include the IP address and a valid range for the IP address.

10. The relay apparatus according to claim 1, further comprising:
    a discard record portion configured to record, for the filtering rule, a numeral number of discarded times when the received frame is discarded when the received frame is discarded by the process execution portion.

11. A relay apparatus configured to relay a frame between a plurality of communication lines, the relay apparatus comprising
    an item group record circuit configured to record at least one item group that includes a plurality of classification items for identifying a received frame;
    a condition record circuit configured to record a plurality of action conditions each of which includes
       a setting of whether each of the plurality of classification items in the item group is set to be valid for each of the classification items, and
       a process content for the frame;
    a rule generation circuit configured to generate a filtering rule for the received frame by extracting at least one of the classification items set to be valid from the item group for each of the plurality of action conditions and by associating extracted at least one of the classification items with the process content, when receiving the frame from any of the communication lines; and
    a process execution circuit configured to execute a process on the received frame in accordance with the filtering rule.

* * * * *